(12) United States Patent
Quintao et al.

(10) Patent No.: US 9,201,955 B1
(45) Date of Patent: Dec. 1, 2015

(54) UNAMBIGUOUS NOUN IDENTIFICATION

(75) Inventors: Frederico Quintao, Belo Horizonte/MG (BZ); Davi De Castro Reis, Belo Horizonte/MG (BZ); Felipe Goldstein, Neuilly-sur-Seine (FR)

(73) Assignee: Google Inc., Mountain View, CA (US)

( * ) Notice: Subject to any disclaimer, the term of this patent is extended or adjusted under 35 U.S.C. 154(b) by 606 days.

(21) Appl. No.: 13/087,544

(22) Filed: Apr. 15, 2011

Related U.S. Application Data

(60) Provisional application No. 61/324,727, filed on Apr. 15, 2010.

(51) Int. Cl.
| | |
|---|---|
| G06F 7/00 | (2006.01) |
| G06F 17/30 | (2006.01) |
| G10L 15/04 | (2013.01) |
| G06F 17/27 | (2006.01) |
| G06F 3/048 | (2013.01) |
| G06F 3/00 | (2006.01) |

(52) U.S. Cl.
CPC ...... *G06F 17/30707* (2013.01); *G06F 17/2795* (2013.01); *G06F 17/30699* (2013.01)

(58) Field of Classification Search
None
See application file for complete search history.

(56) References Cited

U.S. PATENT DOCUMENTS

| | | | |
|---|---|---|---|
| 5,999,896 A | | 12/1999 | Richardson et al. |
| 7,856,441 B1 * | | 12/2010 | Kraft et al. .................... 707/758 |
| 8,086,504 B1 * | | 12/2011 | Dicker et al. ................ 705/27.1 |
| 2005/0080775 A1 * | | 4/2005 | Colledge et al. .................. 707/3 |
| 2007/0255693 A1 | | 11/2007 | Ramaswamy et al. |
| 2009/0204598 A1 * | | 8/2009 | Crane et al. ...................... 707/5 |
| 2011/0131205 A1 * | | 6/2011 | Iyer et al. ..................... 707/728 |

FOREIGN PATENT DOCUMENTS

| | | |
|---|---|---|
| WO | WO0030070 A3 | 9/2000 |
| WO | WO2004010324 A3 | 4/2004 |

OTHER PUBLICATIONS

Zhang et al, 'Mining search engine query logs for social filtering-based query recommendation', Mar. 2008, Applied Soft Computing 8, pp. 1326-1334.*

* cited by examiner

*Primary Examiner* — James Trujillo
*Assistant Examiner* — Cheryl M Shechtman
(74) *Attorney, Agent, or Firm* — Fish & Richardson P.C.

(57) ABSTRACT

Methods, systems, and apparatus for identifying and using unambiguous terms are described. In one implementation, a method for identifying unambiguous terms includes accessing textual content that is included in one or more electronic documents, and extracting one or more terms from the textual content by identifying single words or groups of words in the textual content that relate to a common concept. The method includes analyzing the extracted terms, using a computing system, to determine whether the extracted terms are ambiguous, where a term is determined to be ambiguous when the term has different meanings depending on a context in which the term is used. The method also includes identifying a set of one or more unambiguous terms from the extracted terms. In some implementations, the method may also include using the set of identified unambiguous terms to identify supplemental content to deliver to a user of a computing device.

20 Claims, 8 Drawing Sheets

Chris Jackson - Google Reader - Public

I bought my first PS3 Game. Many of you know that I've been a die-hard loyal fan of the XBox 360 for a long time. I'm still a big fan. Unfortunately I've had several XBox elites and non-elites die on me :( However, there is one still alive. I concluded, that it's just impossible for me to pick between the two, thus my master plan of having both consoles PS3 and XBox 360 was the ultimate way to go...
Expand this post ›

Luiz Chopin Cruz de Oliveira - no gamertag, just PSN ID, or ID for short! :)  Feb 12

Xbox 360 Elite - 90% off - Save up to 90% on this brand new Xbox 360 console with 120 GB disk
www.bidfun.com/xbox-360

Comment  Like  Email  Reply by chat to Chris

UNAMBIGUOUS NOUN IDENTIFICATION

CROSS-REFERENCE TO RELATED APPLICATION

This Application claims priority under 35 U.S.C. §119(e) to U.S. Provisional Application Ser. No. 61/324,727 titled "Unambiguous Noun Identification" filed on Apr. 15, 2010, the disclosure of which is incorporated herein by reference.

TECHNICAL FIELD

This document relates to systems and techniques for identifying terms to associate with electronic content to assist in targeting information that is related to the content.

BACKGROUND

In electronic computing systems, it is often desirable to target content in a manner that improves relevance for users of the systems. For example, search engines target search results to terms that a user submits in a search query (among other things). Also, on-line advertising is frequently targeted so that keywords selected by the advertiser are matched to topics that may be identified by analyzing the content of a web page on which advertisements are to be displayed. The assumption is that advertisements that are semantically similar to the content associated with the page may be more relevant to the user viewing the page. For example, advertisements for mobile telephones may be matched to pages in an on-line newspaper that carry stories about gadgets or other topics that might be of interest to people who might also be interested in buying a new mobile telephone. Such approaches are good for advertisers because they are more likely to draw positive reactions to their advertisements, and are also good for consumers, who are shown advertisements for things that they are more likely to care about.

In social networks, it can be hard to apply the same idea directly. That is because first, the appropriate context to consider when targeting content is fuzzy—it can include the page being viewed, but can also include a profile page for the viewing user, and social-network specific pieces of information entered by the viewing user (e.g., communities or messages sent to other members), among other things. Also, much information in a social network is "noisy," in that it is of low written quality. For example it may be brief, it may include slang, it could include ASCII art, and it may simply be poorly written. Thus, it can be difficult to target content using such information.

SUMMARY

This document describes systems and techniques that may be used to identify terms in particular groupings of text that may be particularly relevant for various purposes, such as for advertisement targeting on a webpage that contains the text. In examples discussed here, the text may be part of a noisy conversation, such as posts that are part of a discussion on a social network, posts that are made to followers on a social network, electronic mail conversations, and similar types of textual communications.

The identification operations discussed here refer to identifying unambiguous nouns, such as names of people that are not likely to relate to multiple different people, or names of objects or things that are not likely to relate to multiple different objects or things. As an example used here, the proper noun "Arthur Miller" would be considered to be ambiguous because it could refer to a playwright, a law professor, or a dancer. In contrast, the proper noun "Albert Einstein" would not be ambiguous because the only relatively famous person with that name is the well-known theoretical physicist.

In part, the identification operations rely on an understanding that people know how to enter a search query to a search engine, so that if they are searching for the law professor named "Arthur Miller," they will recognize that they need to be more precise so as to distinguish the playwright named "Arthur Miller." They may, therefore, enter a search query of "Arthur Miller law professor." The techniques described here recognize this action by a searcher as an implicit statement that the term "Arthur Miller" is ambiguous. The techniques may also recognize that the term "Arthur Miller" is a proper noun because it uses starting capitalization. As such, the techniques here may classify the term "Arthur Miller" as being ambiguous, and may decline to use that term as a matching label for the various actions described here. As one example, the term "Arthur Miller" might not be extracted from a webpage and used to match advertisements to the webpage, out of a concern that the advertisement could be directed toward selling Broadway tickets to a user, and the webpage the user is viewing is actually about the legal profession, so that the advertisement would be mis-targeted due to the ambiguity of the term "Arthur Miller." Other similar examples and details of the process and techniques are discussed more fully below.

In one aspect, a computer-implemented method for identifying unambiguous terms is described. The method includes accessing textual content that is included in one or more electronic documents, and extracting one or more terms from the textual content by identifying single words or groups of words in the textual content that relate to a common concept. The method also includes analyzing the extracted terms, using a computing system, to determine whether the extracted terms are ambiguous, where a term is determined to be ambiguous when the term has different meanings depending on a context in which the term is used. The method also includes identifying a set of one or more unambiguous terms from the extracted terms.

In some implementations, the method may also include one or more of the following features. The method may include using the set of identified unambiguous terms to identify supplemental content to deliver along with target content to a user of a computing device. In some examples, the target content may include a conversation between members of a social network, and using the set of identified unambiguous terms to identify supplemental content to deliver may include matching the identified unambiguous terms to the target content to identify unambiguous target terms and matching the unambiguous target terms to advertisement keywords to select one or more advertisements to present as supplemental content to the user.

In another aspect, a computer-implemented method for identifying relevant terms in textual content is described. The method includes accessing a group of terms that have been filtered to remove terms that are potentially-ambiguous. The method also includes comparing the group of terms to the textual content to find matches between terms in the textual content and the group of terms. The method also includes generating, using a computer system, a subset of terms using terms from the textual content that match terms in the group of terms.

In some implementations, the method may also include one or more of the following features. The method may include using the subset of terms to identify content to deliver to a user of a computing device. In some examples, the textual content may include a conversation between members of a social network, and using the subset of terms to identify content to deliver to a user of a computing device may include matching the subset of terms to advertisement keywords to select advertisements to present to the user of the computing device.

In another aspect, a computer-implemented system for identifying unambiguous terms is described. The system includes an interface of a computer system arranged to receive, at the computer system, a corpus of electronic documents. The system also includes a parser that extracts one or more terms from textual content included in the corpus. The system also includes means for identifying a set of one or more unambiguous terms from the extracted terms, where a term is determined to be ambiguous when the term has different meanings depending on a context in which the term is used.

In some implementations, the system may also include one or more of the following features. The system may include a content engine that identifies, using the set of identified unambiguous terms, supplemental content to deliver along with target content to a user of a computing device. In some examples, the target content may include a conversation between members of a social network, and using the set of identified unambiguous terms may include matching the identified unambiguous terms to the target content to identify unambiguous target terms and matching the unambiguous target terms to advertisement keywords to select one or more advertisements to present as supplemental content to the user of the computing device.

The details of one or more embodiments are set forth in the accompanying drawings and the description below. Other features and advantages will be apparent from the description and drawings, and from the claims.

DESCRIPTION OF DRAWINGS

Figure 4D:
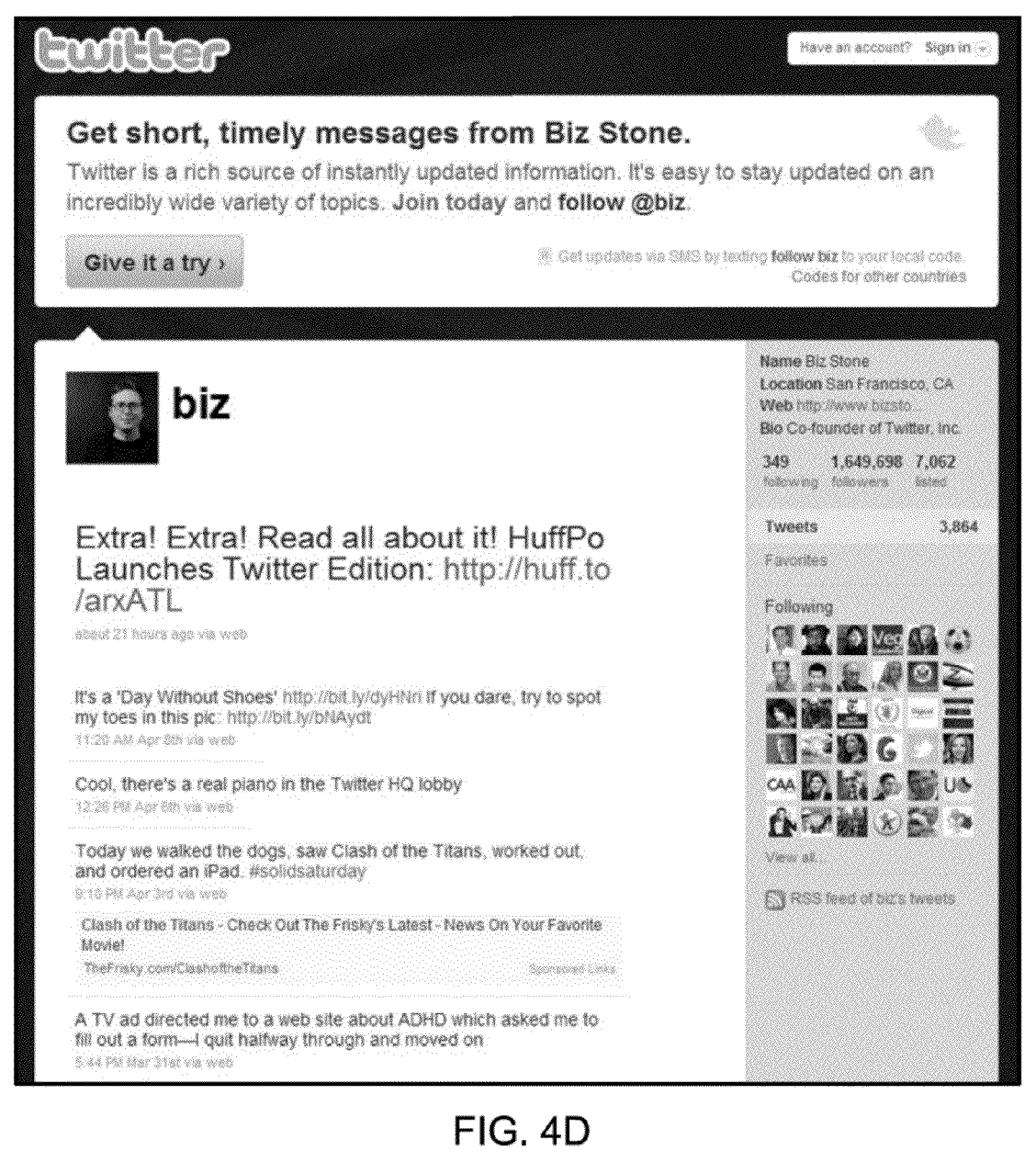

FIGS. 4A-4D are example screen shots of targeting content in various social computer applications.

Like reference symbols in the various drawings indicate like elements.

DETAILED DESCRIPTION

This document describes systems and techniques for identifying terms that are believed to have a high likelihood of being good terms for computerized topic matching, and for using those terms for various purposes, such as advertisement targeting. Specifically, unambiguous nouns may be particularly useful for identifying information to show a user that is related to content the user has already requested to view. For example, advertising information may be targeted to a viewer who is reading a webpage by identifying the unambiguous nouns that are located on the webpage and then matching those unambiguous nouns to keywords to which the advertisements are targeted. The unambiguous nouns are useful because, first, they are nouns—they represent actual things that are likely to match the topic of advertisements. Second, they are unambiguous—so a process that uses them for targeting is less likely to aim a target at one usage of the term, when the web page where the advertisement is displayed was actually directed to a different usage of the term.

Figure 1:
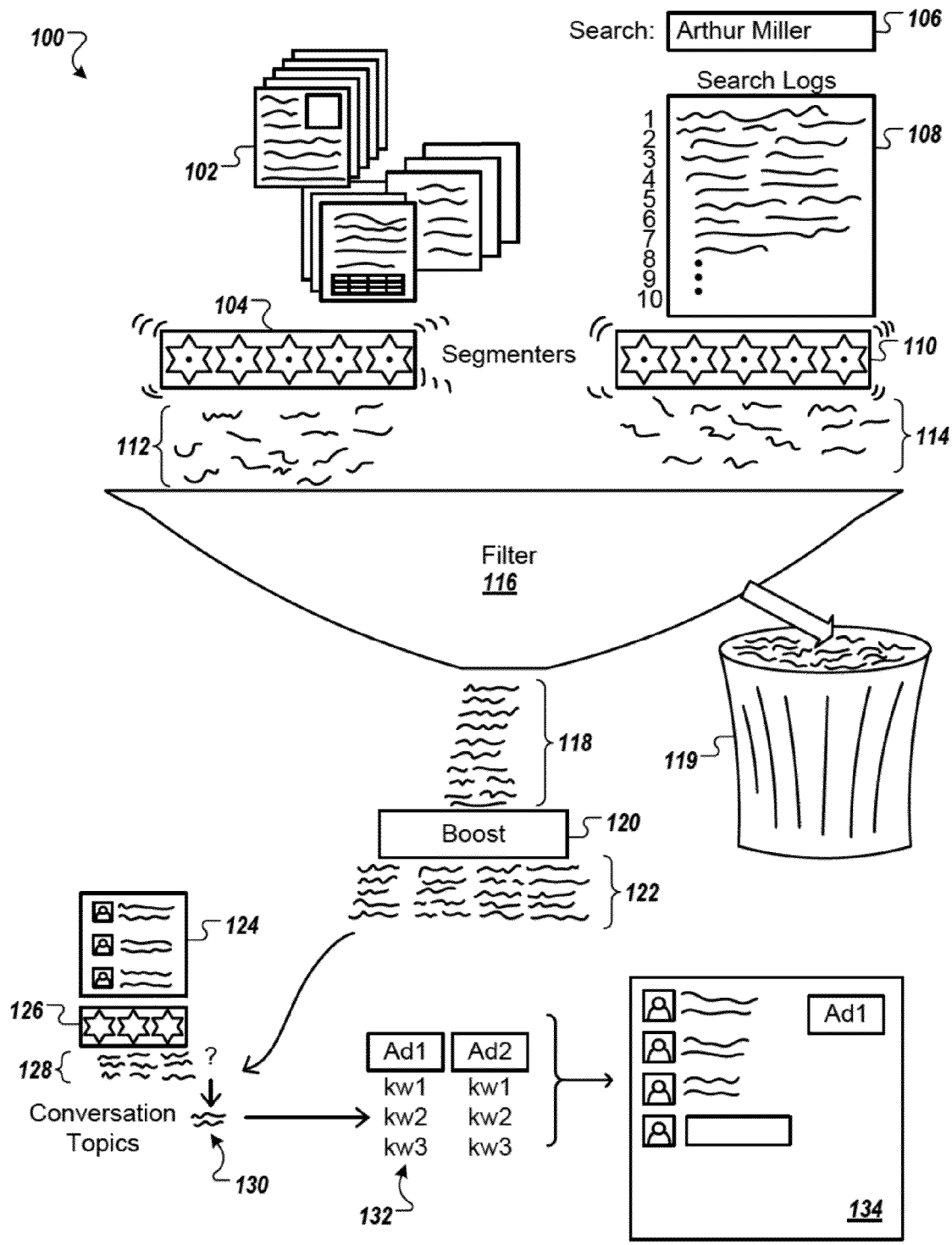
FIG. 1 is a conceptual diagram of a system and process for identifying n-gram labels that are good targeting candidates.

FIG. 1 is a conceptual diagram of a system 100 and process for identifying n-gram labels that are good targeting candidates. In general, the system 100 and process involve mechanisms for analyzing data in an off-line phase of operation in order to identify a list of unambiguous nouns, and then the application of those identified nouns in a run-time phase. The system 100 and process is shown here by analogy as a physical assembly line-like production process starting with an input at the top and generating an output at the bottom of the figure.

Referring now to particular components in the system 100, the process begins with input data that is analyzed to identify a list of unambiguous nouns. One type of input data comes from text on web pages 102, which may be accessed in various manners from corpuses that may be available to a search engine or other Internet property. For example, web pages 102 may be crawled and their text may be extracted, parsed, reorganized, filtered, or classified in various ways. The web pages 102 may be assumed to represent typical usage of words in a particular language, and analysis may be performed to make various determinations based on the assumed usage in the pages 102, as described more fully below.

A second form of input data comes in the form of search log 108 data. The search log 108 may be produced from search queries that have been entered by various users into a search box 106. The search box 106 may appear in various manners, such as in a toolbar in a browser application, or at a home page of a search engine. The search queries are generally entered by users of a search system as character strings of text. The strings may include one word or multiple words that make up a term, or can even be natural language queries. As with the web page 102 text, the search query text may be assumed by the system to represent typical grammatical usage by a population, though in a very different context than its usage in the web pages 102.

The data on the web pages 102 generally takes a long form format such as for web pages from news sources, blogs, and similar sources, or a short form format such as from microblogs, social networking posts, and the like. The input for the search logs 108 usually takes a short form which may include one or multiple words and one or multiple terms, where a term is a set of one or more closely related words that identify a single thing or concept, such as a compound noun or other similar multi-word parts of speech. The input for the search logs 108 is generally not grammatical in form (e.g., it may omit articles and other generic parts of speech) unless it is entered as a natural language query.

In order to generate useful data from the two data sources, the text from the data sources may be provided to segmenters 104, 110, which may extract from the original content a number of n-grams, where an n-gram is a subset of words from the original text, where n is 1 or more, and where the words in an n-gram relate to a common concept (and are set forth by breaking delimiters such as spaces or hyphens). Various mechanisms may be used here to segment the inputs, and the particular mechanism is not critical to the isolation of unambiguous nouns from other terms in the data set.

The generated n-grams 112, 114, are shown graphically as falling out of the segmenters and into a filter 116. The filter 116 may be designed to separate n-grams that represent unambiguous nouns (or are likely to represent unambiguous nouns) into a list 118, from n-grams that do not and are discarded and not used, or are used for a different purpose, as shown symbolically by a garbage can 119. In actual application, the n-grams that are discarded may include adjectives, adverbs, and articles such as "a," "can," and "the." Those n-grams are not used because they are unlikely to be indicative of topics for which a searching user is interested or to which subjects such as advertisements are targeted (e.g., because they are too generic and common).

The n-grams that appear in the list 118 include unambiguous nouns, such as the names of companies and people that appear uniquely for a particular person or company, at least in common usage. For example, while there may be multiple people who are named "Albert Einstein," only one of those people—namely, the well-known theoretical physicist—is likely to be of interest to a typical targeting system and also show up frequently on web pages 102 or search queries 106. Thus, the filter 116 generates an output of unambiguous nouns (for the most part) from an input of widely diverse n-grams. Particular example filtering mechanisms are discussed in more detail with respect to FIGS. 2 and 5 below.

The unambiguous nouns may be boosted by a booster 120. Such boosting may be used to increase the size of the set of unambiguous nouns in common manners, such as by generating alternative spellings (John vs. Johnny), synonyms, and the like. The boosting is designed to maintain the meaning of the unambiguous nouns, but to provide alternative and additional mechanisms by which to express that meaning. After boosting, there is left a matching set 122 at the end of the off-line portion of the process.

The off-line portion of the process may be run whenever updated matching data is desired. For example, over time, new words may enter the lexicon (e.g., "Lady Ga Ga"), and re-running of the off-line process may be able to capture such new terms and add them to the matching set 122.

The run-time portion of the process can be repeated constantly in a way that employs the matching set 122 for a useful purpose. Such a useful purpose may include identifying the topics represented by noisy text, such as text at social networking sites, and to select particular keywords for those sites in matching with other keywords, such as keywords on targeted advertising. The run-time process starts with a content source 124, which is pictured here as involving a conversation at a social networking site, where icons show pictures of each person in the conversation, and text is provided next to the icons to represent the words that each person typed as part of the conversation. For example, one user may have typed "I think techno music is some of the best music out there." Another user may have typed "Oh really, what do you like about techno music?" The first user may respond "I like the concerts." The second user may have responded back "Have you seen any good concerts lately?" And the other user may then respond "Yes! I recently saw Lady Ga Ga, and she was great."

Much of the content of this conversation may be poorly suited for targeting of advertisements, such as the articles "of" and "the." Other language that may be unsuitable includes terms like "good" and "lately." However, the proper noun "Lady Ga Ga" may be particularly helpful to an advertiser that would like to promote records or other merchandise for the artist Lady Ga Ga, since these two users are clearly interested in that artist.

Generating such a match may begin by applying segmenter 126 to the content 124 so as to break the content up into n-grams 128 that may then be analyzed. Those n-grams 128 may be compared to the n-grams in the matching set 122. Such a comparison may be used to identify which terms on the page that holds the content 124 are unambiguous nouns (since the n-grams in the matching set 122 were previously inferred by the filtering process to be unambiguous nouns). Such a process may result, in this example, in a pair of keywords 130, which may be the words "concert" and "Lady Ga Ga." These words are a very small subset of the full content on the page but may be particularly well-suited toward targeting of advertisements to the page.

In a next action, the keywords 130 are compared to keywords 132 provided by advertisers with advertisements that they would like directed toward users of a social network or other Internet property. In this example, one of the keywords for advertisement number one matches one of the keywords 130, and the result is that a subsequent viewer of a page 134 that shows the conversation discussed above will be shown advertisement one. For example, one of the first two conversing users may have returned to their conversation on page 134, or a third user who is in the social network of the two users (or one of the two users) may be looking at page 134. The advertiser may be Lady Ga Ga's record company, which is hoping to reach people who may want to buy her latest album, and may thus use "Lady Ga Ga" as a keyword, and that keyword may be identified as a match for the unambiguous noun "Lady Ga Ga" pulled from content 124.

In this manner, the system 100 can provide for improved targeting of advertisements that are more useful to users of a computer system, and likely to be perceived positively by such users and acted upon by such users.

Figure 2:
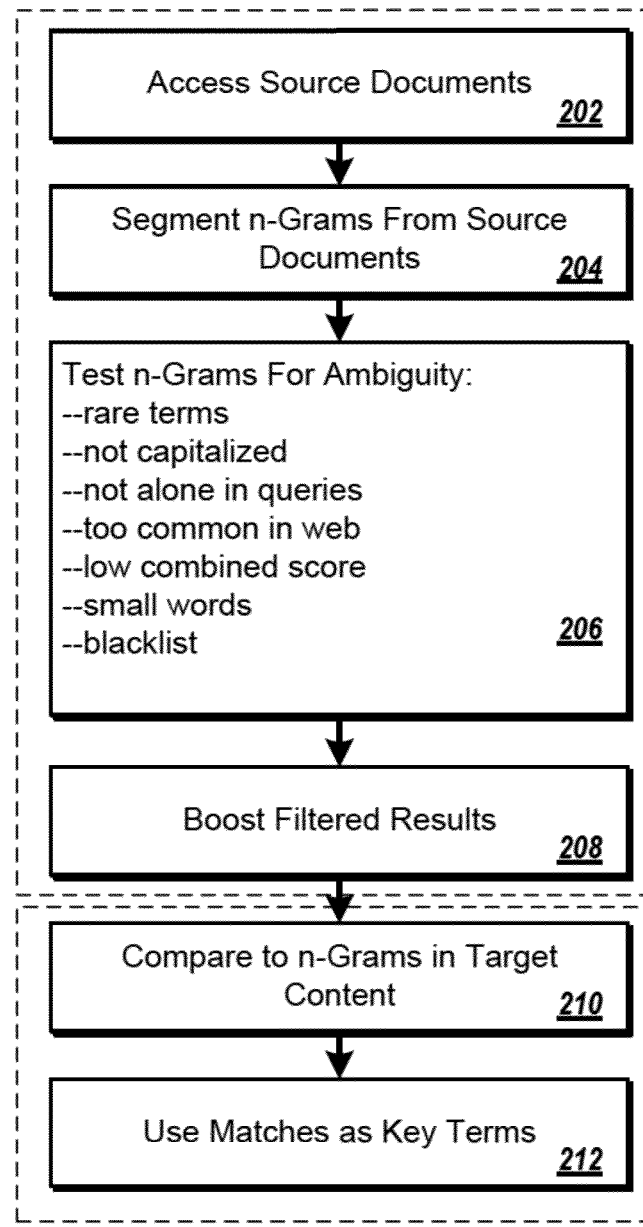
FIG. 2 is a flow chart of an example process for identifying labels and using them to target on-line advertising.

FIG. 2 is a flow chart of an example process 200 for identifying labels and using them to target on-line advertising. In general, the process involves accessing documents in a relatively large corpus of documents, and analyzing text from those documents to identify words in a particular language that can be considered to be unambiguous nouns, and therefore words that are particularly suitable for targeting of information. Such identification of words or terms can be performed as an off-line process, as is indicated by the dashed box around boxes 202-208. Such identified words may then be used in a matching process for identifying similar unambiguous nouns, and to target text sources so that content can be directed in an appropriate manner to the target text sources. The matching can be performed many times as a run-time process, as shown by the lower dotted box in the figure. For example, the off-line portion of the process may be performed generally at any time by an information provider, such as a search engine company. The run-time portion may be applied repeatedly whenever targeted content needs to be identified for presentation to a computer user, such as in the form of targeted Internet advertisements.

The process begins at box 202, where source documents are accessed. As discussed above, source documents may take a variety of forms. For example, a particular corpus of Web documents may be accessed. As one example, a general web page corpus may be accessed and the text from the pages may be analyzed. In another example, a particular segment of documents, such as documents written for a technical audience, including articles posted to a source such as the IEEE website, may be accessed. Alternatively, or in addition, documents in the form of search queries that have been joined into search logs may be accessed in the text and the queries analyzed. For example, queries typed in by users to a general search engine that is available to the public may be accessed, or queries submitted to a topic-specific search engine may also be analyzed and accessed.

At box 204, n-grams are segmented from the source documents that were accessed. The segmenting may take various familiar forms, and may result in groups of one or more words being generated where the groups represent particular common concepts. For example, a person's full name may be identified as an n-Gram, and such identification may be performed by a process that recognizes that such terms are commonly used together and that uses such recognition to infer that the words belong together in an n-gram.

At box 206, the n-grams are tested for ambiguity in a process that filters out n-grams that are not likely to represent unambiguous nouns. The filtering process can involve a number of filtering levels, and failure at any one of the levels may result in the n-gram being filtered out of the process. The particular levels may each take into account one or more metrics by which n-grams, and distributions of n-grams in a corpus, may be measured.

A first metric determines whether the n-gram is so rare in the sample corpus that statistics relating to its usage are unlikely to be reliable. Such a determination may be made by considering the n-gram's Inverse Document Frequency (IDF), which is a well-known measure that effectively provides a normalized measure of an n-gram's popularity in a sample corpus. It also serves as a good confidence indicator for all remaining sub-filters. The more popular a particular n-gram is, the more data a system has on it, and the more likely it is for this data to be meaningful.

A second sub-filter looks at the Caps First Ratio (CFR) of an n-gram, which is a measure of how frequently the words in the n-gram are capitalized in the corpus. This factor is generally a strong indicator of names, since in many languages, proper nouns are supposed to be capitalized in general usage (e.e. cummings excepted). The CFR metric has the obvious property of detecting nouns, but it also has another subtle and interesting characteristic. Words that are unambiguous tend to show up as part of noun compounds as an extra qualifier. Because of that, a system may account every capitalized word not only to the CFR score of a compound to which it belongs, but also to the CFR score of the unigram itself. In some implementations, CFR scores may be treated differently in a filter that is applied to languages such as Chinese where capitalization is not meaningful.

These first two metrics can be referred to as web collections metrics, and they may be computed from a large map-reduction by visiting all documents in a general web corpus. Other metrics can be referenced as query log metrics, as they can be performed on query logs like log 108 in FIG. 1.

A first query log metric is the Sessions Inverse Document Frequency (SIDF), which is analogous to the web metric of the comparable name, but it is calculated over a search engine query stream. Each session is considered as a document, and the language of the document is the language most frequently detected among the queries that are part of the session.

This signal has similar properties to its web counterpart, but with a bias towards concepts and against intrinsic language characteristics. Stop words and helper language constructions appear much less often in query streams. Because of that, besides having similar usage as the IDF, an additional usage for this metric is that it is generally safe to discard anything that is not popular in the query stream. In the web data, there are often valuable concepts and language constructions in the same inverse document frequency range.

A second query metric, which can be very relevant, is the Sessions Exact Ratio (SER). It tells how often a given n-gram shows up by itself in the search box. It is generally the strongest indicator that a particular n-gram is unambiguous when taken out of context.

A third query metric, search bias (SB), is not directly derived from the query stream, but rather obtained through a combination of sessions and web signals. Search bias can be thought of as the ratio of appearance of an n-gram in user searches divided by the ratio of appearance of the same n-gram in a web corpus. However, a naive calculation of this number can lead to a value with bad properties due to very common words in the web and the high frequency of noun compounds in search engine searches. To avoid those issues, search bias can be calculated taking into account only "noble" occurrences of an n-gram in web and searches. For the web, only occurrences with caps first may be considered noble, while in users searches, only those occurrences where the n-gram appears by itself in the query are considered.

One potentially difficult property of search bias is that it tends to assign high scores for slang and mistyped words. This is a direct consequence of the low editorial quality of a query log corpus. However, n-grams that frequently are searched with extra qualifications, such as "Indiana Jones," will still have a high search bias value indicating that they are part of a larger unambiguous concept with smaller related variants.

Values may be set for each of the filters above, such as by using empirical data regarding the operation of a system while performing actual filtering. In one example, all n-grams having a SIDF lower than fifteen may be filtered out of the process. This may remove n-grams that are considered too rare, which may result in approximately eight percent of the n-grams being removed.

In another example, if uni and IDF are greater than twelve, and SIDF is greater than twelve, an n-gram may be filtered out. This may be directed at removing rare unigrams, which may remove about one percent more of the n-grams from a typical English corpus. There are several unigrams typos that are not rare enough to be discarded by SIDF, and they also come with all types of capitalization. Since unigrams are more frequent than compounds, a more restrictive threshold may be applied.

As another example, if CFR is less than 0.4, then an n-gram can be rejected. Not only is this filter responsible for restricting the n-grams to nouns, it also rejects general nouns. For example, the noun "ball" has a very low caps first ratio, but "Wilson NCAA Reaction Basketball" is almost always typed in all-caps.

In another example, if SER is less than 0.35, the corresponding n-gram may be removed. This reflects a key intuition that users understand that search engines have little context to understand their communication, and because of that, users tend to formulate unambiguous queries.

And if SB<0.01, the relevant n-gram can also be filtered out. Some n-grams, like "Unfortunately" tend to have both high CFR because they are used to start phrases and high SER because they also have low query volume and are rarely part of a larger query. This filter understands that these types of language constructions are much more common in the web corpus than in the search corpus, and may therefore discard them.

A combination of filters may also be applied to remove certain n-grams. For example, if an n-gram barely squeaks by on all measures, but as a composite scores poorly, the n-gram may be removed. In one implementation, an n-gram can be filtered out if CFR+SER+SB is less than one. Also, very short terms like articles are generally not good targeting terms, so n-grams having fewer than three characters may also be filtered out.

Finally, certain words may be included on a blacklist of words that should not be considered for comparison. Some n-grams that have very extreme metrics tend to pass through all the sub-filters, and they can simply be blacklisted based on a manual review of terms that otherwise pass through the filter without a blacklist, and on a user's recognition of which terms would not be appropriate for matching. For an English-language filter, for example, a list of greetings expressions, such as "Merry Christmas," weekday names, and month names may be blacklisted.

The sub-filters may be applied in series, so that an n-gram will be excluded from being considered an unambiguous noun that is good for comparison purposes if it meets any of the tests. Larger "pass" rates may be obtained by changing the test values (and vice-versa) or by removing some of the sub-filters. Likewise other sub-filters may also be added, depending on the implementation.

The particular filtering process may be arranged so that an operator of a system may adjust the sensitivity of the filtering, such as by turning particular levels of the filtering on or off. For example, an operator may choose to turn off a blacklist filter if the blacklist has been determined to be filtering out too much information. Also, the filter may be tuned in this manner based on the particular application to which the analysis is being applied. As one example, certain terms may be considered inappropriate in some contexts, and not in others. A blacklist for those terms may thus be turned on in the filtering process for some circumstances and left off for others.

Also, although a rather simplified form of a multi-step filter is discussed here, other types of filtering mechanisms may also be used. For example, a machine learning system may be trained using data sources that unambiguously identify a large number of nouns (e.g., actor and actress names from an online movie database, names of products from a product search system, etc.), and the system may identify common aspects of the usage of such nouns in a training mode. The system may then apply such observations as rules in a manner consistent with this disclosure.

Figure 3:
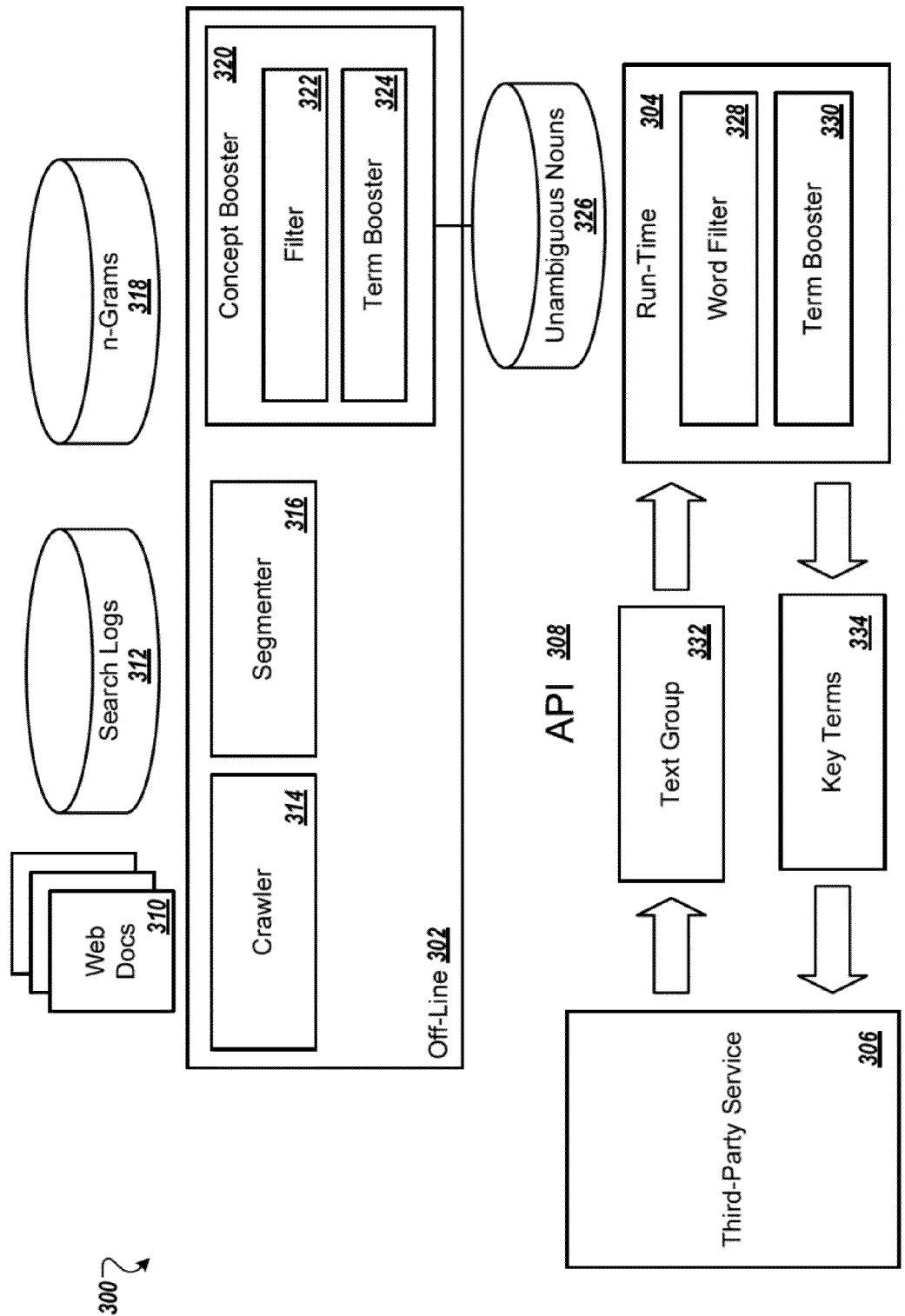
FIG. 3 is a schematic diagram of a system for identifying and using unambiguous nouns in computer targeting.
Figure 4A:
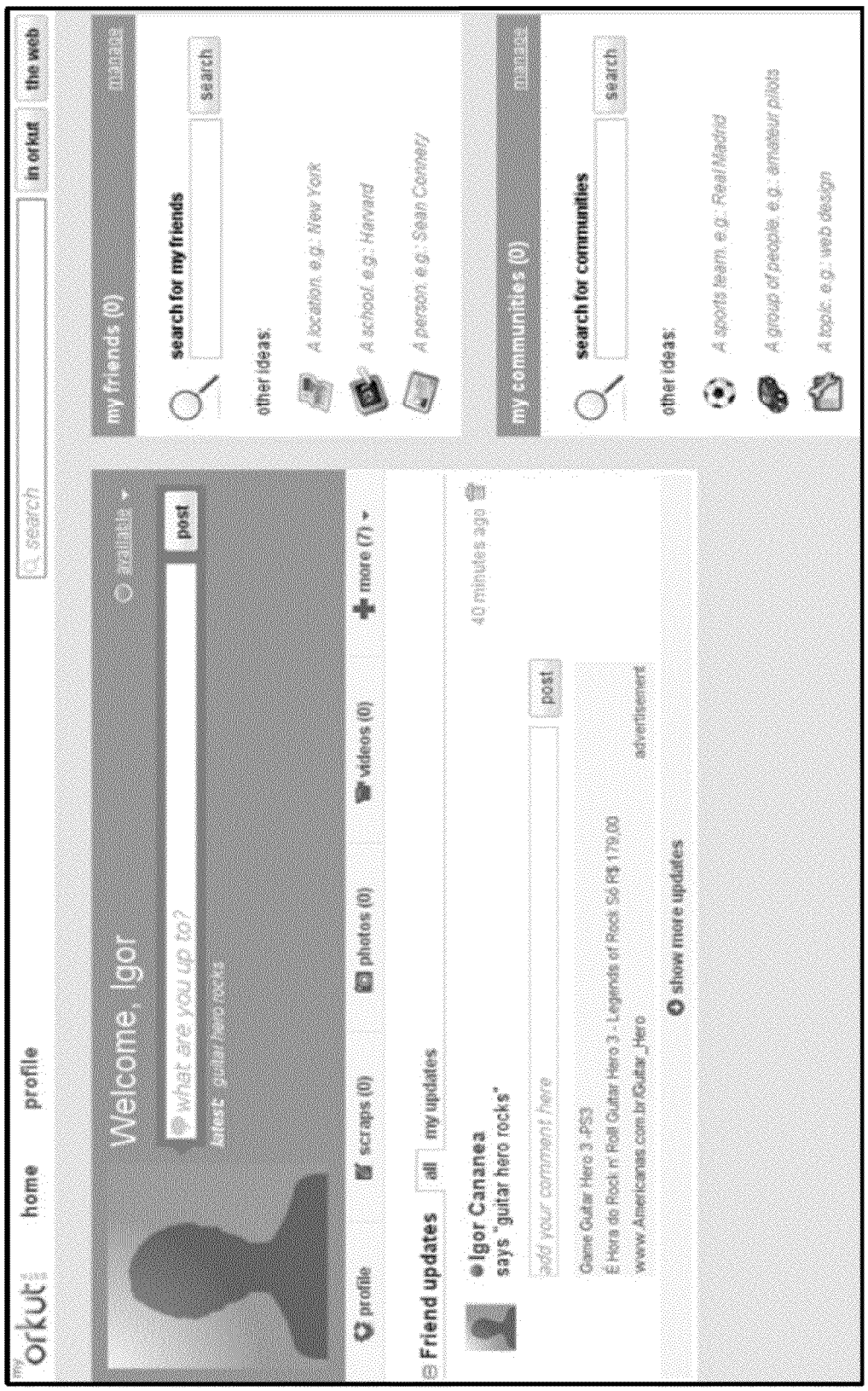
Figure 4C:
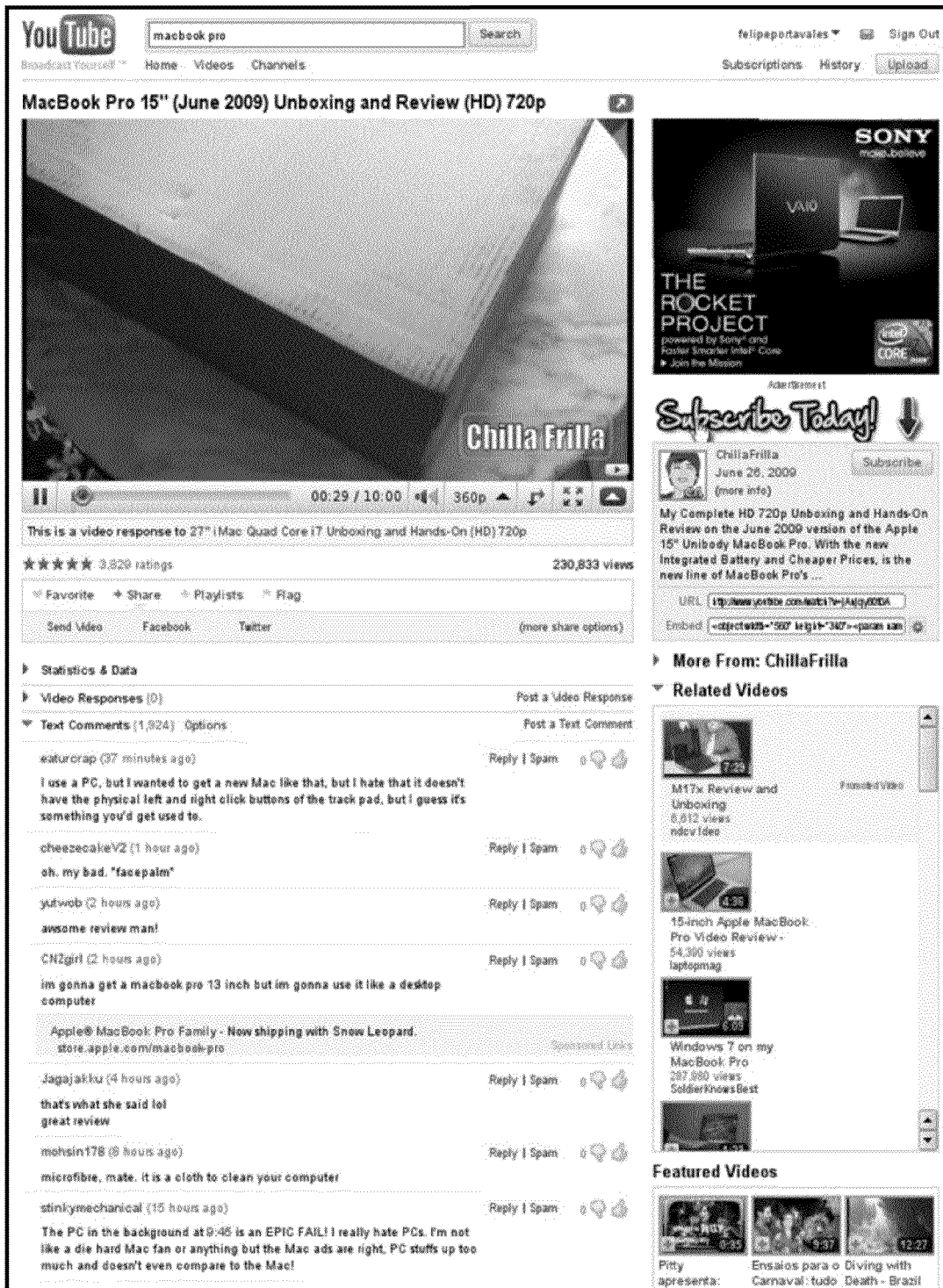

FIG. 3 is a schematic diagram of a system 300 for identifying and using unambiguous nouns in computer targeting. In general, the system 300 may be used for identifying particularly relevant matches in a submitted text, where relevance in this example is judged by whether certain terms (or n-grams) in the text appear to be unambiguous nouns.

The system 300 as shown has three major components—an off-line component 302, a run-time component 304, and a third-party service 306. Each of these components may be implemented by a separate computer server system that may include one or more computers programmed to carry out the operations discussed here.

The off-line component 302 is responsible for identifying unambiguous nouns from one or more corpuses of documents. One corpus is web documents 310 and another is search logs 312, which can be like the web pages 102 and search log 108 discussed with respect to FIG. 1. A crawler 314 may take a familiar form and may be responsible for automatically navigating through web pages that are available on the web and returning a file of text from the web pages that can be used for further analysis.

A segmenter 316 may parse the text that is recovered, both from the crawler 314 and from the search logs 312, in various acceptable manners. The goal of the segmentation is to generate n-grams 318 that represent logical groupings of words in those corpuses.

Further processing may occur by way of a concept booster 320, which may operate to identify n-grams that are more likely than other n-grams to represent unambiguous nouns. Such a process may first make use of a filter 322 like the filters discussed above, for identifying unambiguous nouns and removing non-nouns or ambiguous terms. The booster 320 may also include a term booster 324 which is programmed to increase the number of n-grams provided by the filter by including unambiguous nouns that are equivalent to the unambiguous nouns identified by the filter 322. The total unambiguous noun output of the concept booster 320 is then stored as unambiguous nouns 326.

The run-time component 304 includes a word filter 328 and term booster 330 that can be applied to content from sources such as web pages and social networking conversations, like those discussed in examples above and below. The word filter 328 may apply the unambiguous nouns 326 in a matching process to identify unambiguous nouns in the content source. The term booster may then expand on those identified matches, such as if term booster 324 is not included in the off-line component 302.

The run-time component 304 may act as a service, in various implementations, that can be accessed through an application programming interface (API) 308 by various requesting services that pass a text group 332 and receive in response a filtered version of the text group in the form of key terms 334. Such third-party services 306 (which can be part of the same corporate organization as the other components or a different organization) may then apply those terms in appropriate manners like those discussed in examples above and below. Such application may occur directly or by passing the key terms 334 to such other services, or by having them so passed.

FIGS. 4A-4D are example screen shots of targeting of content in various social computer applications. The following paragraphs address targeting to each various type of service in turn.

TWITTER is a social web service by which users can send and read text-messages with up to 140 characters, also known as tweets. This and other similar types of social web sites may include mostly conversational text and noise, with few or no relevant concepts to extract. For example, tweets in general do not necessarily follow grammatical rules for capitalization or punctuation. In addition, Internet slang (such as "IMHO") and control characters such as # and @ are often present in these documents. For some tweets, there is not enough text to automatically obtain context, yet most human beings are able to understand the underlying message. To feed the classifier system as described herein, each tweet may be considered independent from others, and the text of each tweet may be used as an input to the classifier.

FACEBOOK is a social network site where users can create virtual connections with their friends and share messages, videos, photos, and links. One FACEBOOK feature is the status message update, which allows users to express their mood, feelings, concerns or just share a message with their friends. The status message is much like a tweet, but the 140 character limit is not imposed. Since users can follow-up on their friends' updates, the entire conversation (i.e., the update itself along with the comments triggered by it) may be used as input for the classifier.

Television listings represent commercial, descriptive text that is available in traditional media and already investigated by previous works, in contrast to the content from TWITTER and FACEBOOK. A television listing entry is typically composed of the title of the TV show, an optional sub-title, and a short synopsis, which together form the snippet used to feed the classifier.

Various applications of the classification techniques discussed here may also be employed. For example, queries may be extracted for recommender systems. This application is inspired in the television listings stream, but the general idea can be extended to any appropriate recommender system that takes into account an input of possibly assorted data and requires the input to be human-readable. For example, a user may be watching the nightly listings stream provided by a digital cable-powered television, and may be interested in one of the movies from the listing. By selecting the interesting item (e.g., "THE X-FILES"), the user may see more detailed information about the movie. In such an example, the application can extract the relevant concepts from the stream, such as the names of the starring actors, the series or movie name, and other relevant information, with the advantage that all of the information extracted is in human-readable form. The application may then submit a search request to a back-end server with the relevant concepts in order to retrieve a list of related attractions that the user can watch upon purchasing the selected listing (e.g., via pay-per-view). In the example above, the application would possibly suggest to the user other movies that feature Gillian Anderson and/or David Duchovny.

Another potential application of the techniques described herein is topic labeling. This application may include continuously or periodically monitoring an information stream, and extracting concepts that better represent each entry in the stream. The most frequent patterns may be used externally for statistical purposes. This may be useful in the context of monitoring trending topics in social networks. Social networks are used by their members to express opinions about different subjects, for instance the latest trends in the news, a decisive basketball match that is about to start, the members' concerns about a natural phenomenon that just happened, etc. By analyzing the stream of information from one or more social networks, a system may be able to determine which are the trending topics, e.g., hot topics that are commanding users' attention at any given time.

In the example above, the classifier system may be used to automatically extract one or more human-readable concepts from the possibly fuzzy stream of updates that users post in social networks, and to use these concepts as input to a trending or forecasting tool. In this manner, the system may avoid the creation of internal idioms, such as the TWITTER # anchor, making the tools simpler to use.

Another application may be advertisement targeting in social networks. In social networks, users may periodically update their status messages with whatever they have in mind. This communication channel is often shared with their friends and possibly other members of the network, and a single update can give rise to a discussion in the channel. The number of daily updates in various popular social networks can be very large, As such, this channel may be a potential candidate for input of content-targeted advertisement systems. For instance, it may be advantageous to deliver an advertisement such as "Buy tickets for the coming Jonas Brothers show!" next to a discussion about musical tastes where a young girl claims to be the biggest fan of the Jonas Brothers music group in the world.

However, the conversational text may bring even more complexity to the already difficult task of delivering content-targeted advertisements. Feeding these systems with noisy text may lead them to return non-relevant advertisements, hence hurting the user experience. As such, the system may use a classifier such as that discussed here as a filtering layer on top of current content-targeted advertisement systems to tune those systems to deliver relevant advertisements for conversation systems like social networks.

Figure 5:
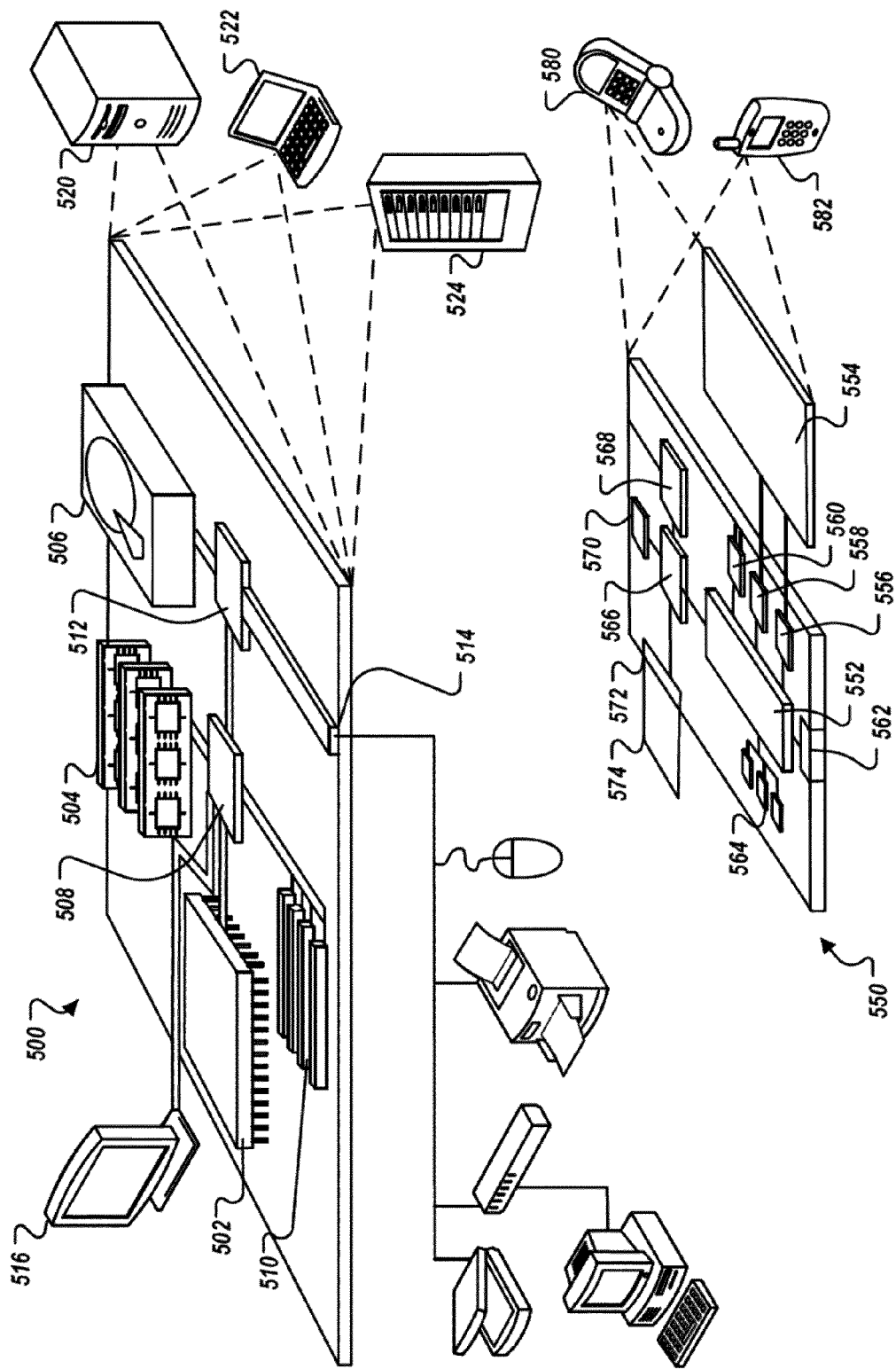
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple busses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various busses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures may not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
    accessing textual content that is included in one or more electronic documents;
    extracting one or more phrases from the textual content, the extracting including identifying single words or groups of words in the textual content that relate to a common concept;
    determining, for each given extracted phrase, a caps first ratio that specifies a frequency with which one or more words included in the given extracted phrase are capitalized within the one or more electronic documents;
    determining, by one or more computers and for each given extracted phrase, whether the given extracted phrase has two or more alternative meanings, the given extracted phrase being determined to have two or more alternative meanings when the caps first ratio of the given extracted phrase does not meet a specified caps first ratio threshold, and the given extracted phrase being determined to not have two or more alternative meanings when the caps first ratio meets the specified caps first ratio threshold;
    identifying a set of one or more unambiguous terms from the extracted phrases based on the determination;
    identifying, based on the set of one or more unambiguous terms, supplemental content related to the textual content; and
    distributing, over a communications network and to a user device, data that initiate presentation of the supplemental content at a display of the user device.

2. The method of claim 1, further comprising using the set of identified unambiguous terms to identify supplemental content to deliver along with target content to a user of a computing device.

3. The method of claim 2, wherein the target content comprises a conversation between members of a social network, and using the set of identified unambiguous terms to identify supplemental content to deliver comprises matching the identified unambiguous terms to the target content to identify unambiguous target terms and matching the unambiguous target terms to advertisement keywords to select one or more advertisements to present as supplemental content to the user of the computing device.

4. The method of claim 1, further comprising expanding the set of one or more unambiguous terms by including additional terms that correlate with the unambiguous terms.

5. The method of claim 4, wherein the additional terms include alternative spellings of the unambiguous terms.

6. The method of claim 4, wherein the additional terms include synonyms of the unambiguous terms.

7. The method of claim 1, further comprising filtering the given extracted phrase to remove ambiguous terms using one or more query log metrics.

8. The method of claim 7, wherein the query log metrics include a sessions inverse document frequency (SIDF) metric that relates to a popularity of the given extracted phrase in a query.

9. The method of claim 7, wherein filtering the extracted phrase to remove ambiguous terms further comprises using a search bias (SB) metric that relates to a ratio between a frequency with which an extracted term is found in a query log to a frequency with which an extracted term is found in web page content.

10. A system comprising:
    one or more computers; and
    a data store storing instructions that, when executed by the one or more computers, cause the one or more computers to perform operations comprising:
    accessing textual content that is included in one or more electronic documents;
    extracting one or more phrases from the textual content, the extracting including identifying single words or groups of words in the textual content that relate to a common concept;
    determining, for each given extracted phrase, a caps first ratio that specifies a frequency with which one or more words included in the given extracted phrase are capitalized within the one or more electronic documents;
    determining, by one or more computers and for each given extracted phrase, whether the given extracted phrase has two or more alternative meanings, the given extracted phrase being determined to have two or more alternative meanings when the caps first ratio of the extracted phrase does not meet a specified caps first ratio threshold, and the given extracted phrase being determined to not have two or more alternative meanings when the caps first ratio meets the specified caps first ratio threshold;
    identifying a set of one or more unambiguous terms from the extracted phrases based on the determination;
    identifying, based on the set of one or more unambiguous terms, supplemental content related to the textual content; and
    distributing, over a communications network and to a user device, data that initiate presentation of the supplemental content at a display of the user device.

11. The system of claim 10, wherein the operations further comprise using the set of identified unambiguous terms to identify supplemental content to deliver along with target content to a user of a computing device.

12. The system of claim 11, wherein the target content comprises a conversation between members of a social network, and using the set of identified unambiguous terms to identify supplemental content to deliver comprises matching the identified unambiguous terms to the target content to identify unambiguous target terms and matching the unambiguous target terms to advertisement keywords to select one or more advertisements to present as supplemental content to the user of the computing device.

13. The system of claim 10, further comprising expanding the set of one or more unambiguous terms by including additional terms that correlate with the unambiguous terms.

14. The system of claim 13, wherein the additional terms include alternative spellings of the unambiguous terms.

15. The system of claim 13, wherein the additional terms include synonyms of the unambiguous terms.

16. The system of claim 10, wherein the operations further comprise filtering the given extracted phrase to remove ambiguous terms using one or more query log metrics.

17. The system of claim 16, wherein the query log metrics include a sessions inverse document frequency (SIDF) metric that relates to a popularity of the given extracted phrase in a query log.

18. The system of claim 16, wherein filtering the given extracted phrase to remove ambiguous terms further comprises using a search bias (SB) metric that relates to a ratio between a frequency with which an extracted term is found in a query log to a frequency with which an extracted term is found in web page content.

19. A non-transitory computer readable storage medium storing instructions that, when executed by a data processing apparatus, cause the data processing apparatus to perform operations comprising:

accessing textual content that is included in one or more electronic documents;

extracting one or more phrases from the textual content, the extracting including identifying single words or groups of words in the textual content that relate to a common concept;

determining, for each given extracted phrase, a caps first ratio that specifies a frequency with which one or more words included in the given extracted phrase are capitalized within the one or more electronic documents;

determining, by one or more computers and for each extracted phrase, whether the extracted phrase has two or more alternative meanings, the given extracted phrase being determined to have two or more alternative meanings when the caps first ratio of the given extracted phrase does not meet a specified caps first ratio threshold, and the given extracted phrase being determined to not have two or more alternative meanings when the caps first ratio meets the specified caps first ratio threshold;

identifying a set of one or more unambiguous terms from the extracted phrases based on the determination;

identifying, based on the set of one or more unambiguous terms, supplemental content related to the textual content; and distributing, over a communications network and to a user device, data that initiate presentation of the supplemental content at a display of the user device.

20. The computer readable storage medium of claim 19, wherein the operations further comprise filtering the given extracted phrase to remove ambiguous terms using one or more query log metrics.

* * * * *